Dec. 17, 1957     E. S. TUPPER     2,816,589
SALAD BOWL
Filed May 17, 1954     3 Sheets—Sheet 1
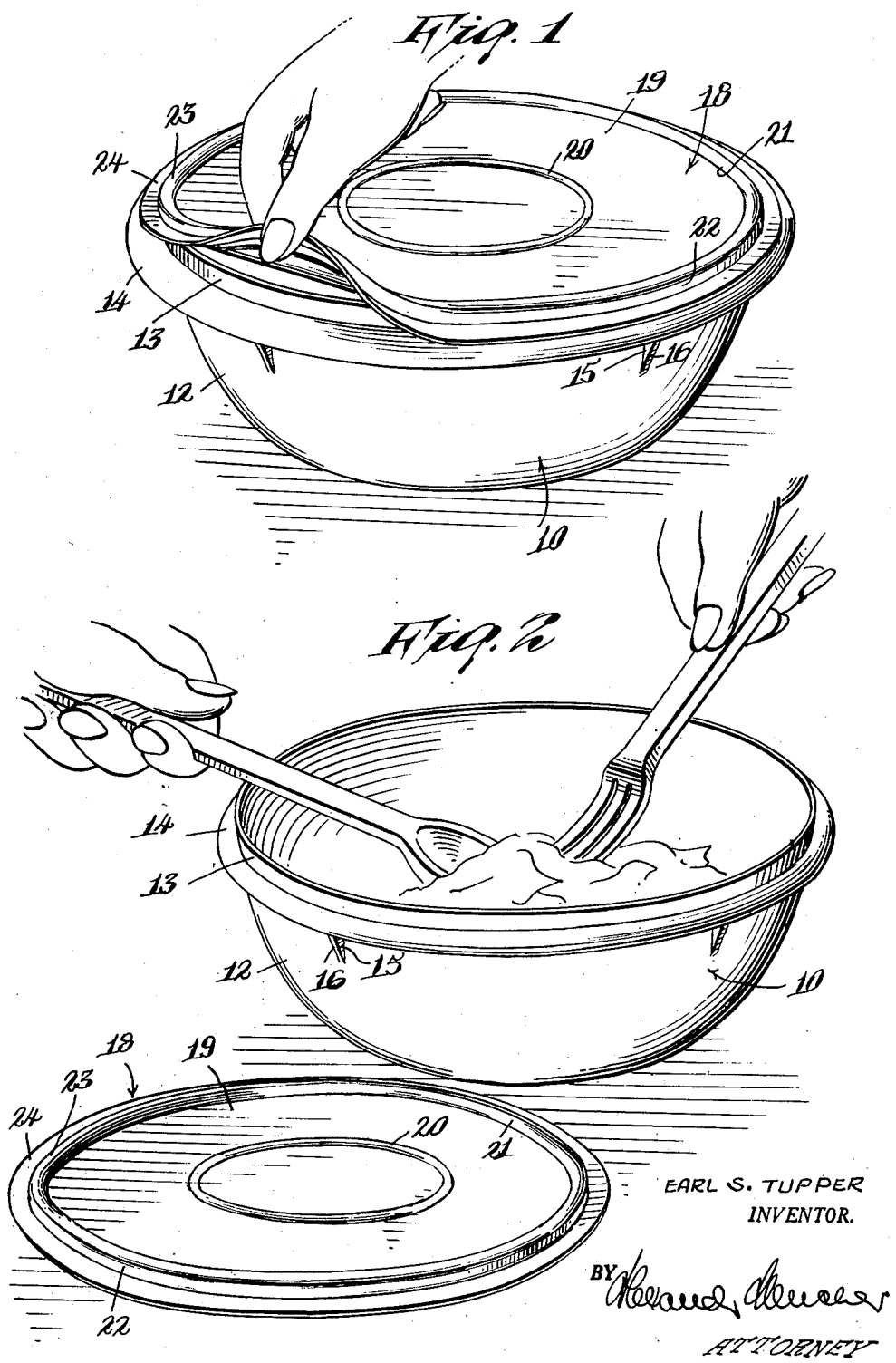
EARL S. TUPPER
INVENTOR.
BY
ATTORNEY Dec. 17, 1957  E. S. TUPPER  2,816,589
SALAD BOWL
Filed May 17, 1954  3 Sheets-Sheet 2
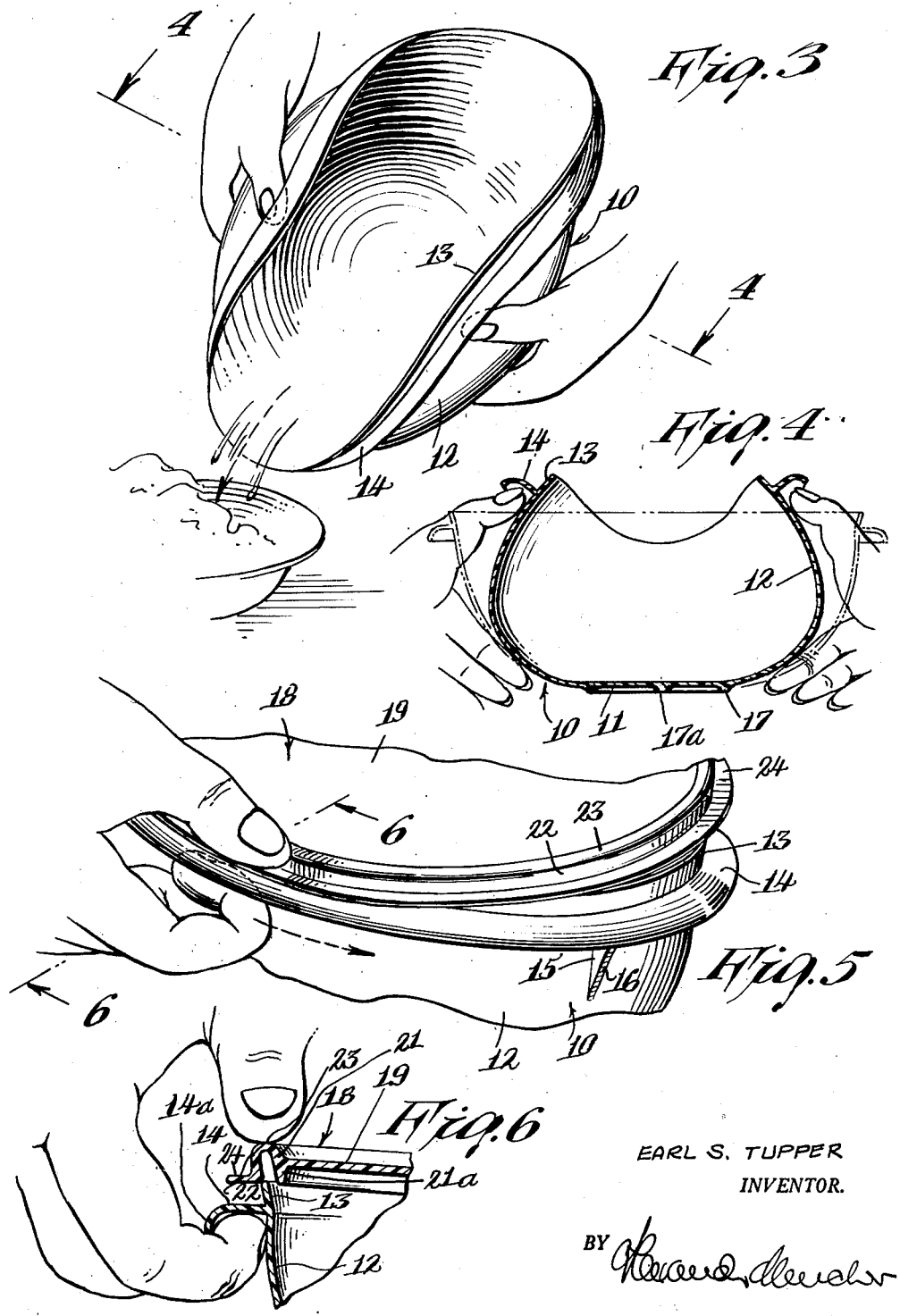
EARL S. TUPPER
INVENTOR.
BY
ATTORNEY Dec. 17, 1957  E. S. TUPPER  2,816,589
SALAD BOWL
Filed May 17, 1954  3 Sheets-Sheet 3
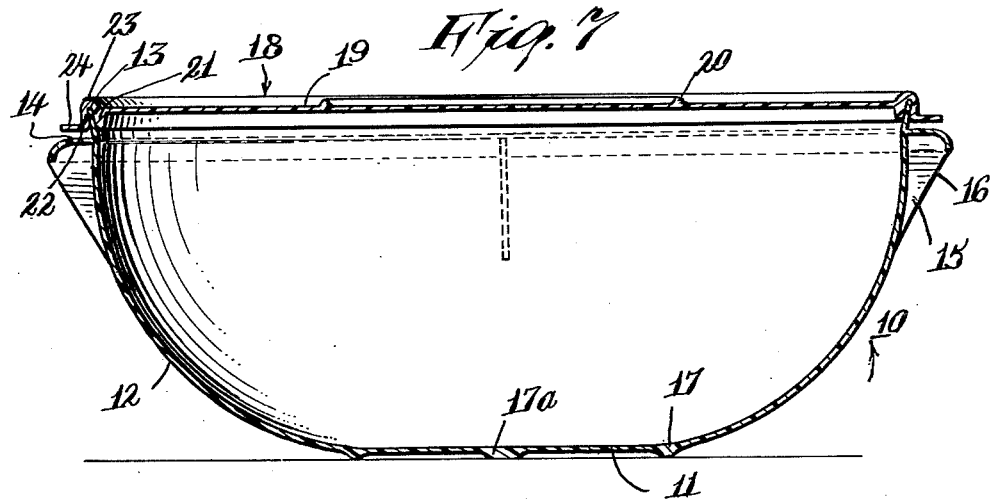
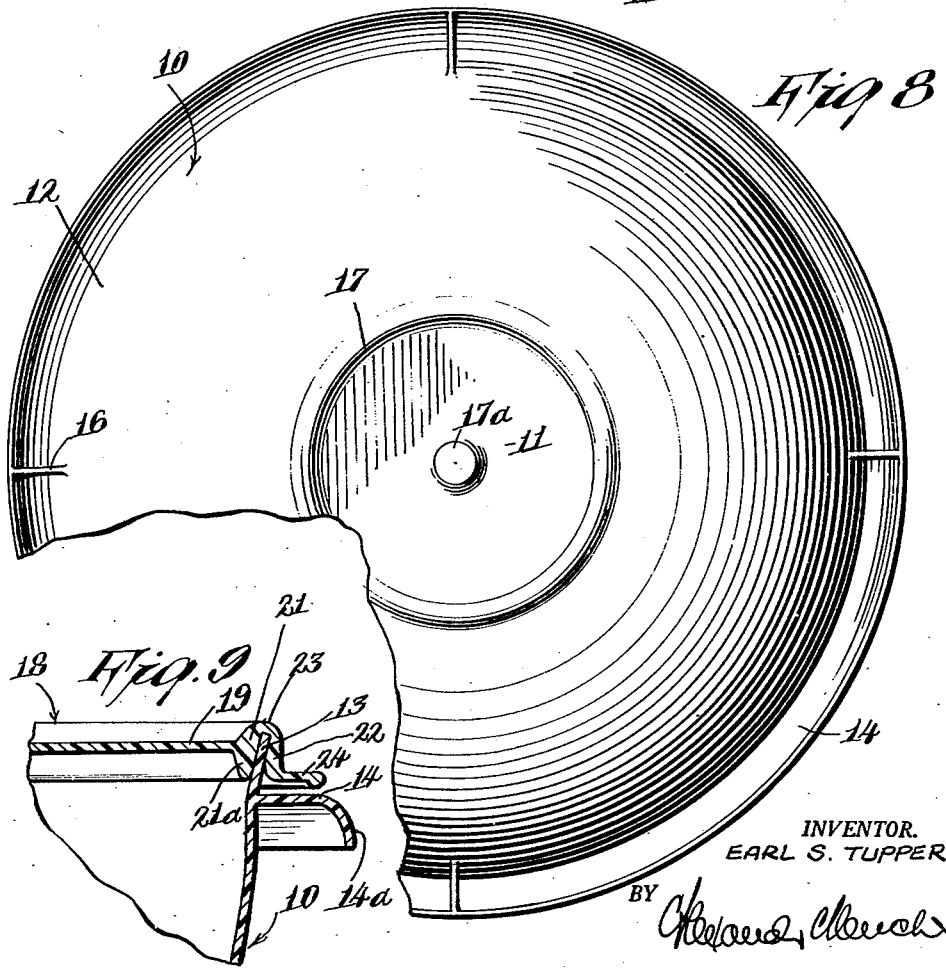
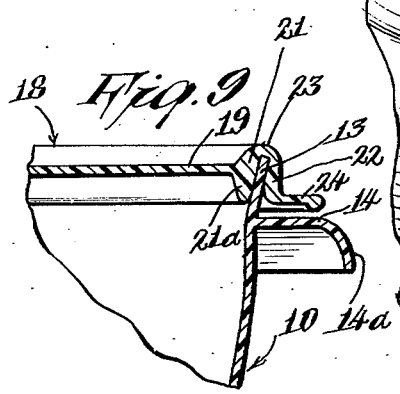
INVENTOR.
EARL S. TUPPER
BY
ATTORNEY

United States Patent Office 2,816,589
Patented Dec. 17, 1957

2,816,589

SALAD BOWL

Earl S. Tupper, Upton, Mass.

Application May 17, 1954, Serial No. 430,099

3 Claims. (Cl. 150—0.5)

This invention relates generally to vessels or receptacles for storing, dispensing, beating and mixing of food materials, but more specifically to an open-mouthed, wide, and relatively shallow bowl-shaped body of resilient and locally distortable material to serve alternately on one hand as a shape retaining, sturdy and non-breakable bowl, and on the other hand as a pouring or dispensing vessel, for the contents while opposite portions of the side wall of the bowl-shaped body are compressed together for the formation of a spout.

As a feature of the invention, the bowl-shaped body is provided with a peripheral flange below the rim edge and which is provided with radially disposed web members or tabs for vertical support of the flange to give both the mouth of the vessel and the flange normal rigidity. Moreover the flange and the tabs together serve as holding elements for the vessel when used alone and as supports or aids in the application and removal of a hermetically sealable and removable closure member.

A further feature of the invention resides in the provision of a bowl-shaped vessel suitable for use as salad bowl and for making salad and which is substantially rigid and shape retaining, but for pouring or dispensing purposes is capable of temporary spout formation by hand pressing opposite portions of the wall together.

Part of the structure herein is shown in U. S. Patent No. 2,487,400, granted to the applicant on November 8, 1949, and part of the structure is further shown in U. S. Patent No. 2,765,831, granted to the applicant on October 9, 1956 on application Ser. No. 327,476, filed on December 23, 1952.

Another object of the invention resides in the provision of a vessel provided with a removable and a hermetically sealable cover and which is sanitary, durable, easy to clean, efficient in operation, capable of withstanding sudden impact without breaking or being fractured and economical in use.

Another feature resides in the provision of a vessel which has a minimum power of gas absorption and which lends a sterile medium for prevention of putrefaction and spoilage of food contents.

These objects and other incidental ends and advantages of the invention will hereinafter appear in the progress of the disclosure as pointed out in the claims.

Accompanying this specification are drawings showing a preferred form of the invention wherein:

Figure 1 is a view in perspective showing the vessel and a cover therefor, the cover being partially disengaged.

Figure 2 is a view in perspective of the vessel with the cover in removed position and showing the use thereof as a salad bowl.

Figure 3 is a view in perspective of the vessel in a resiliently folded position to serve as a pouring or dispensing vessel of contents theretofore mixed and formulated in the vessel.

Figure 4 is a reduced sectional view of Figure 3 across the plane 4—4 thereof.

Figure 5 is an enlarged and fragmentary perspective view showing the manner of applying the cover member to the vessel.

Figure 6 is a partial sectional view of Figure 5 across the plane 6—6 thereof.

Figure 7 is an enlarged diametric sectional view of the vessel with the cover or closure member in engagement therewith.

Figure 8 is an enlarged bottom plan view of the vessel.

Figure 9 is an enlarged and partial sectional view of an edge portion of the vessel and the closure member.

In accordance with the invention and the preferred form shown, the vessel, generally indicated by numeral 10, is in the form of a bowl having a flat bottom wall 11 and a curvilinear side wall 12. The bowl is compressible for the formation of a spout-like shape and to attain this end is relatively shallow with respect to the top diameter.

Below and adjacent a rim 13, which may be outwardly flared as shown, is a continuous or peripheral and outwardly extending flange 14 provided with spaced radially disposed reinforcing tabs or depending web members, each designated by numeral 15. The inner edge of each of said tabs is integral with or secured to the outer face of side wall 12 while the opposite free edge 16 as shown tapers inwardly and downwardly from the outer and free edge of flange 14. The upper edge of tab 15 is integral with the lower surface of flange 14. The bottom bowl wall 11 is provided with a concentric bead 17 and a central concentric projection 17a in coplanar relationship so that when the bowl or vessel 10 is on a support, there is provided an air insulating space therebetween.

Vessel 10 is preferably formed of polyethylene or other material having similar physical characteristics and has many functions; as a storing vessel engageable with a hermetically sealable cover generally indicated by numeral 18; as a salad mixing and salad dispensing bowl; as a pouring or emptying vessel when compressed between opposite portions of the side wall to form a dispensing spout for the theretofore mixed or prepared food therewithin.

Closure member or cover 18 may similarly be formed of polyethylene or other material having similar physical characteristics and is provided with a central wall 19 having a raised and concentric rib 20 to maintain wall 19 in normally flat condition. Extending off the edge of central wall 19 is a raised grooved rim having an inner wall 21, a spaced outer wall 22, and a top joining wall 23, the outer wall having an outwardly extending flange 24.

The groove defined by walls 21, 22 and 23 is adapted to engage the rim portion 13 of vessel 12 whereby a sealing engagement is effectuated in the same manner as set forth in the aforementioned applicant's United States Patent No. 2,487,400, dated November 8, 1949.

It is to be observed that flange 24 of closure 18 and vessel flange 14 are suitably spaced when the parts are assembled so that a finger may be introduced therebetween for initiating removal of the cover as indicated in Figure 1 and as will hereinafter appear. Moreover, flange 14 has its peripheral portion downwardly and outwardly curved as at 14a and extends beyond the terminal edge of closure flange 24 both for expediting introduction of said finger and to add resistance against bending along and athwart the annular axis.

It is further to be noted that the inner dimension or diameter of outer wall 22 is smaller than the outer dimension of rim portion 13, and that the sealing points are at the upper portion of the inner side of wall 22 and the lower side of connecting wall 23 with respect to the outer and top sides of rim portion 13. These sealing points obtain only when the outer dimension of inner wall 21 is less than the inner dimension of rim portion 13. As best shown in Figure 9, closure groove walls 21 and 22 are thicker than central wall 19 for both providing strength of hermetical sealing connection with rim 13 and for serving as a perimetric reinforcing band to maintain the normal rigidity of the closure 18, wall 21 having a depending bead type of flange 21a below 19 for this purpose.

In order to remove the closure member from rim 13, the first step required is to introduce the thumb of one hand between closure flange 24 and vessel flange 14 and using central wall 19 as a fulcrum by the rest of the hand a portion of the closure engaging groove is cleared from vessel rim 13. Thereafter, the cover is simply peeled off by the thumb and index finger in a progressive manner optionally utilizing the other hand for grasping vessel flange 14 to exert opposing pressure at flange 14 and tab 15.

Closure member 18 is applied to vessel 10 in a progressive manner by running the thumb along groove top wall 23 and the finger along the underside of vessel flange 14 at opposing pressures after a portion of the closure groove and the vessel rim are brought into engagement by the thumb and finger as illustrated in Figures 5 and 6.

The assembly is serviceable as a storing device or canister of large dimensions wherein vapors or gases will not escape owing to the hermetical sealing between the parts. Moreover, the assembly is substantially rigid and reinforced against deformation and alteration of shape by sudden impacts and application of pressures by the effective reinforcing rings furnished by the closure groove and the vessel flange 14 and tabs 15.

The vessel itself by reason of the bowl-shaped side walls and by reason of the relatively wide dimension at the mouth as compared to the shallow height is capable of being compressed against the opposing force of flange 14 by applying pressure on opposite portions of the side wall to distort the shape for the formation of a pouring vessel at either end as best shown in Figure 3. Upon the removal of pressure from the side wall as shown in Figures 3 and 4, the vessel bounds back into normal shape as shown in Figures 7 and 8. The susceptibility of the yielding and return of the side wall for the formation of a dispensing spout is brought about by the specific curvilinear shape of the side wall, the relatively shallow depth of the vessel above the concentric and relatively small dimensioned bottom flat wall 11, and the bottom flat wall bead 17. Moreover, the compressing force of the hands on the side wall of the vessel overcomes the rigidity of the mouth of the vessel afforded by the flange 14 and causes this flange also to be distorted. However, upon the removal of hand pressure, the flange 14 helps the vessel to spring back into substantially normal shape and the mouth is thus maintained for normal purposes in rigid condition.

The closure member 18 may be made of polyethylene or other material having similar physical characteristics. However, the vessel will operate in all of its functions even if the closure member is made of a more rigid material such as polystyrene or other less resilient material.

The spaced tab members 15 as shown are in diametric relationship, but they may be applied at any spaced points along the side wall of vessel 10, and in addition to serving as handles for canister and vessel use, they also serve to reinforce the vessel flange 14 as has been mentioned.

It is to be noted that effect of the use of polyethylene or other material having similar physical characteristics for both the vessel 10 and closure 18 is to give the joint between rim 13 and walls 21, 22 and 23 a mutually live resistance. The use of said material furthermore contributes to quiet operation and cleanliness since it is an absorber of sound and is not capable of pulverizing a mixing instrument nor capable of itself being pulverized.

As shown, the curvilinearity of side wall 12 is in the form of a spherical section to contribute leverage for inward folding for spout formation against the resistance of the mouth reinforcing elements 14, 14a and 15.

Vessel 10 and closure member 18 may be molded by compression, injection or in any other manner and the assembly or the vessel per se is particularly suitable for food storage since polyethylene is chemically inert, resilient and locally distortable, light in weight, unbreakable, odorless, unaffected by working temperatures, sterile and consequently resistant to mildews, micro-organisms and insects, washable and pleasant to the touch.

In assembly with the closure member 18, as best seen in Figure 7, the bowl flange 14, maintained more rigid in all directions by supporting tabs 15 and by the flange curvilinear portion 14a, is uniquely qualified to serve as a sturdy grip for the tips of the fingers to sustain the weight of the bowl and contents while the heels of the hands maintain downward pressure on closure 18 when the assembly with contents is vigorously shaken. The combined assembly particularly is adapted for mixing tossed salads because of the lightness in weight and non-breakability of the material from which the bowl is made and because of the positive and hermetical sealing by closure 18.

I wish it understood that minor changes and variations in the location, integration, material and size and shape of parts may all be resorted to without departing from the spirit of the invention and the scope of the appended claims.

I claim:

1. A bowl for storing, dispensing, beating and mixing of food materials comprising an open-mouthed body member substantially in the shape of a spherical section, the mouth being at the largest diameter of said body member, a bottom flat supporting member formed at the bottom of the bowl for maintaining the bowl in a stable position on a tabular surface, a reinforcing and integral annular member spaced below and adjacent the rim of the mouth of the bowl for shape-retaining purposes of the bowl, the said bowl being formed of a resilient and locally distortable plastic material whereby the bowl is made substantially rigid and form-retaining by said reinforcing member and whereby said rigidity is capable of being overcome for deformation of the bowl to form a spout by hand pressing the side at opposite areas.

2. A bowl for storing, dispensing, beating and mixing of food materials comprising an open-mouthed body member having side wall shaped substantially in a spherical section, the mouth being at the largest diameter of the body member, a concentric and flat bottom wall of relatively small diameter to support the bowl for stable position, a peripheral and outwardly extending flange below and adjacent the rim portion of the said side wall, spaced supporting brackets integral with and secured between the said flange and the said side wall, said bowl being formed of a resilient and a locally distortable plastic material whereby the bowl is made substantially rigid and form-retaining by said reinforcing element and brackets and whereby said rigidity is capable of being overcome by hand pressure on opposite areas of the side wall to resiliently deform the bowl for the formation of a spout.

3. A bowl for storing, dispensing, beating and mixing of food materials comprising an open-mouthed body member having a side wall substantially shaped in a spherical section, the mouth being at the largest diameter of the body member, a concentric flat bottom wall of relatively small diameter to support the bowl for stable position, a peripheral and outwardly extending flange below and adjacent the rim portion of the said side wall, spaced supporting brackets integral with and secured between the said flange and the said side wall, said bowl being formed of a resilient and a locally distortable plastic material whereby the bowl is made substantially rigid and form-retaining by said reinforcing element and brackets and whereby said rigidity is capable of being overcome by hand pressure on opposite areas of the side wall to resiliently deform the bowl for the formation of a spout, a removable cover member for said rim and formed of resilient and locally distortable material, said cover member having an annular raised groove formed of reinforced grooved inner, outer and top connecting walls for removable and hermetical sealing engagement with said rim, the grooved inner wall having a depending annular and reinforcing rim to resist deformation both of the cover and the bowl to which said cover is attachable.

References Cited in the file of this patent

UNITED STATES PATENTS

| | | |
|---|---|---|
| D. 30,524 | Ahrenfeldt | Apr. 11, 1899 |
| D. 137,794 | Kleinberg | May 2, 1944 |
| 251,214 | Golding | Dec. 20, 1881 |
| 483,033 | Weissenthanner | Sept. 20, 1892 |
| 876,425 | Barcalow | Jan. 14, 1908 |
| 1,238,830 | Schuster et al. | Sept. 4, 1917 |
| 1,600,055 | Meyer | Sept. 14, 1926 |
| 1,886,373 | Bracey | Nov. 8, 1932 |
| 2,023,470 | Hart | Dec. 10, 1935 |
| 2,487,400 | Tupper | Nov. 8, 1949 |
| 2,589,967 | Sawyer | Mar. 18, 1952 |
| 2,606,586 | Hill | Aug. 12, 1952 |
| 2,610,490 | Tupper | Sept. 16, 1952 |